(12) United States Patent
O'Brien, III et al.

(10) Patent No.: US 10,534,733 B2
(45) Date of Patent: Jan. 14, 2020

(54) FLEXIBLE I/O SLOT CONNECTIONS

(71) Applicant: EMC IP Holding Company LLC, Hopkinton, MA (US)

(72) Inventors: Walter A. O'Brien, III, Westborough, MA (US); Matthew J. Borsini, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/963,420

(22) Filed: Apr. 26, 2018

(65) Prior Publication Data

US 2019/0332557 A1 Oct. 31, 2019

(51) Int. Cl.
*G06F 13/20* (2006.01)

(52) U.S. Cl.
CPC ................... *G06F 13/20* (2013.01)

(58) Field of Classification Search
None
See application file for complete search history.

(56) References Cited

U.S. PATENT DOCUMENTS

| | | | | |
|---|---|---|---|---|
| 6,072,798 A * | 6/2000 | Beasley | ............. | H04L 12/5601 370/395.72 |
| 6,931,460 B2 * | 8/2005 | Barrett | ................ | G06F 11/0745 710/5 |
| 7,013,336 B1 * | 3/2006 | King | ................... | G06F 11/3034 709/224 |
| 7,363,417 B1 * | 4/2008 | Ngai | .................... | G06F 13/4022 710/305 |
| 7,447,778 B2 * | 11/2008 | Matters | ............... | G06F 11/2002 709/217 |
| 9,432,298 B1 * | 8/2016 | Smith | ................. | H04L 49/9057 |
| 10,062,429 B1 * | 8/2018 | Borole | ............... | G06F 13/4068 |
| 2002/0006111 A1 * | 1/2002 | Akita | ................... | H04B 10/272 370/235 |
| 2006/0067209 A1 * | 3/2006 | Sheehan | ........... | H04L 29/08846 370/216 |
| 2014/0075073 A1 * | 3/2014 | Wong | ..................... | G06F 13/22 710/220 |
| 2014/0267224 A1 * | 9/2014 | Lum | ..................... | G06T 15/005 345/419 |
| 2015/0271828 A1 * | 9/2015 | Cha | ....................... | H04L 43/103 370/230 |

(Continued)

*Primary Examiner* — Michael Sun

(74) *Attorney, Agent, or Firm* — Muirhead and Saturnelli, LLC

(57) ABSTRACT

Techniques for configuring a system may include selecting one of a plurality of I/O slots to be allocated a number of lanes connected to a processor; and responsive to selecting the one I/O slot, sending a selection signal to a multiplexer that selects the one I/O slot from the plurality of I/O slots and configures the number of lanes for use by the one I/O slot where the number of lanes connect the one I/O slot to the processor. The system may be a data storage system and the lanes may be PCIe lanes used for data transmission. For each I/O slot, an I/O module may be inserted, removed or replaced (e.g., removed and then replaced with a new I/O card). A management controller may select the one I/O slot and send the selection signal in accordance with one or more policies. The system may support hot plug I/O modules.

20 Claims, 7 Drawing Sheets

(56) References Cited

U.S. PATENT DOCUMENTS

| | | | |
|---|---|---|---|
| 2015/0324312 A1* | 11/2015 | Jacobson | G06F 13/4022 |
| | | | 710/104 |
| 2016/0380694 A1* | 12/2016 | Guduru | H04B 10/038 |
| | | | 398/5 |
| 2017/0083467 A1* | 3/2017 | Mishra | G06F 13/362 |
| 2017/0153347 A1* | 6/2017 | Saunders | H01R 24/58 |
| 2018/0189222 A1* | 7/2018 | Srivastava | G06F 13/287 |
| 2018/0227949 A1* | 8/2018 | Tiirola | H04W 74/04 |
| 2018/0253458 A1* | 9/2018 | Goyal | H04L 67/1097 |

* cited by examiner

FLEXIBLE I/O SLOT CONNECTIONS

BACKGROUND

Technical Field

This application generally relates to I/O connections in a system.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with aspects of the techniques herein are a method, system and computer readable medium for configuring a system. One of a plurality of I/O slots is selected where the select I/O slot is to be allocated a number of lanes connected to a processor. Responsive to selecting the one I/O slot, a selection signal is sent to a multiplexer that selects the one I/O slot from the plurality of I/O slots and configures the number of lanes for use by the one I/O slot where the number of lanes connect said one I/O slot to the processor. When the number of lanes are configured for use by said one I/O slot, the number of lanes may be used for data transmission between the processor and an I/O module inserted in the one I/O slot, whereby no other I/O slot of the plurality of I/O slots is configured to use the number of lanes allocated to said one I/O slot. While the number of lanes are configured for use by said one I/O slot, a second of the plurality of I/O slots may be selected to be allocated the number of lanes. Responsive to selecting the second I/O slot, a second selection signal may be sent to the multiplexer that selects the second I/O slot from the plurality of I/O slots and reconfigures the number of lanes for use by the second I/O slot where the number of lanes connect said second I/O slot to the processor. Selecting one of a plurality of I/O slots and selecting a second of the plurality of I/O slots may be performed in accordance with a policy. The policy may indicate to allocate the number of lanes to the one I/O slot rather than the second I/O slot when an I/O module is inserted into the one I/O slot and when no I/O module is inserted in the second I/O slot. The policy may indicate to allocate the number of lanes to the one I/O slot rather than the second I/O slot when no I/O module is inserted into the second I/O slot and a first I/O module inserted into the one I/O slot has a higher performance bandwidth capability than all I/O modules inserted into any other ones of the plurality of I/O slots. The policy may indicate to allocate the number of lanes to the second I/O slot rather than the one I/O slot when an I/O module is inserted into the second I/O slot and when no I/O module is inserted in the one I/O slot. The policy may indicate to allocate the number of lanes to the second I/O slot rather than said one I/O slot when no I/O module is inserted into said one I/O slot and an I/O module inserted into the second I/O slot has a higher performance bandwidth capability than all I/O modules inserted into any other ones of the plurality of I/O slots, a current configuration may include the number of lanes allocated for use by a particular one of the plurality of I/O slots, and the policy may indicate that user approval is needed prior to modifying the current configuration, when modifying causes reconfiguration of the number of lanes for use by another one of the plurality of I/O slots other than the particular one. Modifying may include sending another selection signal to the multiplexer to select the another one of the plurality of I/O slots and may cause reconfiguration of the number of lanes for use by the another one of the plurality of I/O slots. Each of the plurality of I/O slots may be a hot plug I/O slot wherein an I/O module may be inserted into, and removed from, the I/O slot without restarting the system. The management controller may determine a type of I/O module, if any, that is inserted into each of the plurality of I/O slots. The management controller may select the one I/O slot from the plurality of I/O slots in accordance with the policy. The management controller may send the selection signal to the multiplexer that selects the one I/O slot from the plurality of I/O slots and configures the number of lanes for use by the one I/O slot. The management controller may perform the determining step using management interface connections to the plurality of I/O slots. Each of the plurality of I/O slots may provide an indication signal to the management controller as to whether an I/O module is inserted in the I/O slot. The management controller may perform the step of selecting a second of the plurality of I/O slots to be allocated the number of lanes responsive to a change in the indication signal sent from a sending one of the plurality of I/O slots. The change in the indication signal from the sending one I/O slot may indicate whether an I/O module has been removed from the sending one I/O slot or whether an I/O module has been inserted into the sending one I/O slot. The management controller may receive the change in the indication signal sent from the sending I/O slot; and responsive to the change in the indication signal from the sending one I/O slot indicating that an I/O module has been inserted into the sending one I/O slot, the management controller may query the sending one I/O slot, using a management interface connection, regarding a type of I/O module inserted in the sending one I/O slot.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
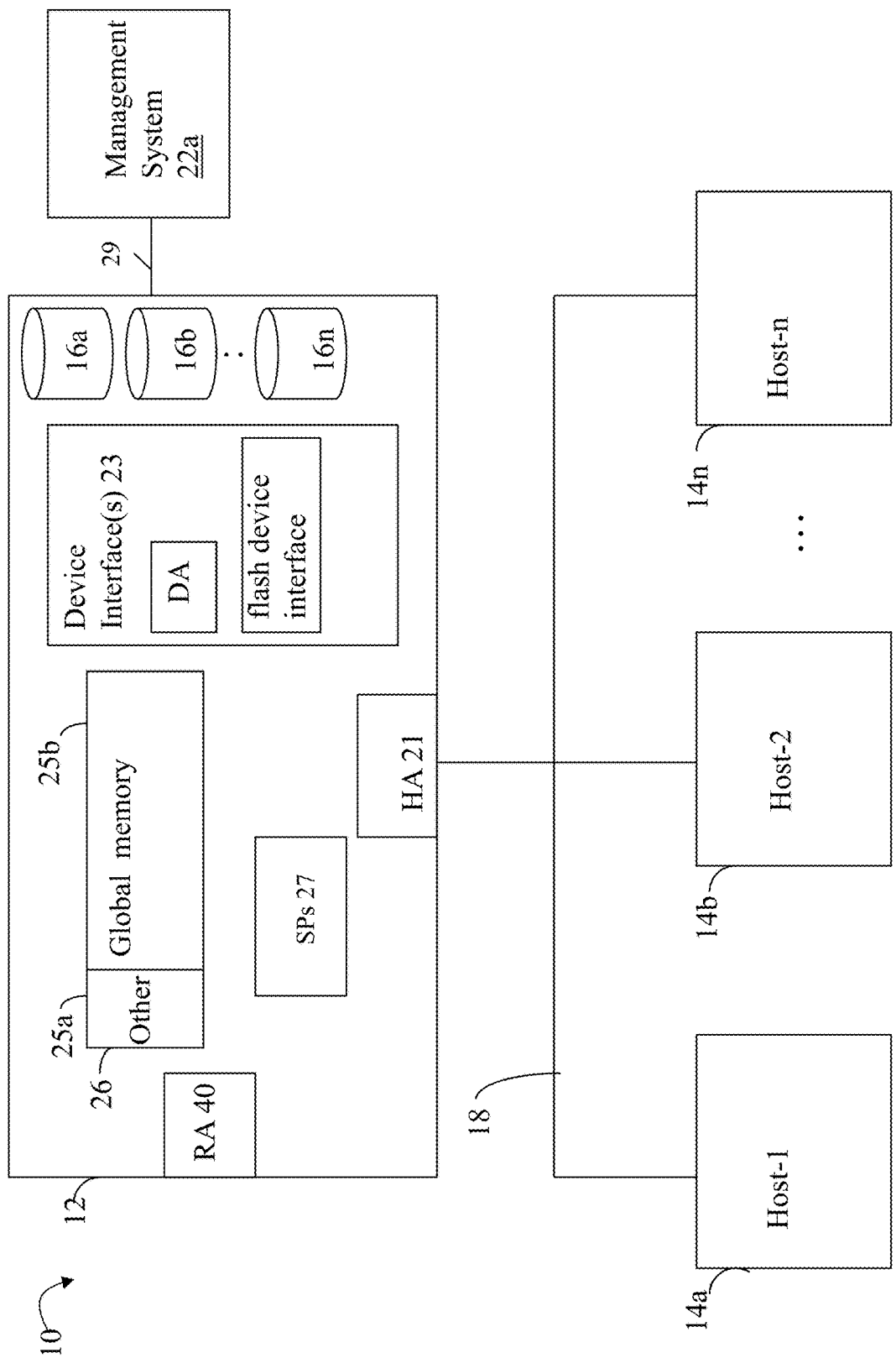
FIGS. 1, 3, 4 and 5 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that may be used in an embodiment in accordance with techniques herein that contains no moving mechanical parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system or VNX® data storage system by Dell Inc., that includes multiple storage processors (SPs). Each of the SPs 27 may comprise a CPU including one or more "cores" or processors and each may have their own memory used for communication between the different front end and back end components rather than, or in addition to, other global memory accessible to all storage processors. In such embodiments, memory 26 may represent memory of each such storage processor along with the other global memory.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In at least one embodiment in accordance with techniques herein, a data storage system may include two SPs, as described above, which include multi-core CPUs, such as those by Intel Corporation. Data storage systems typically have I/O slots into which I/O cards or I/O modules (e.g., such as PCIe (Peripheral Component Interconnect Express) boards, modules or cards) may be inserted. I/O modules support additional I/O ports providing additional I/O connections in a system. For example, the I/O slots may be used with I/O modules providing additional front end I/O ports or connections (e.g., front end connectivity) between the data storage system and the hosts. As another example, the I/O slots may be used with I/O modules providing additional back end I/O ports (e.g., back end connectivity), such as to non-volatile physical storage devices. In at least one embodiment, each SP may have a number of these I/O slots that are connected to the SP via PCIe connections. A PCIe connection consists of one or more data-transmission lanes, connected serially. Each lane consists of two pairs of wires, one for receiving and one for transmitting. PCIe lanes are internal, high-speed, point-to-point, bidirectional connections. Multiple PCIe lanes can be combined or grouped into a single high-bandwidth channel. For example, as used herein and known in the art, groups of 4, 8 and 16 PCIe lanes may be so combined and are denoted, respectively, as ×4, ×8, and ×16 (although other groupings are possible). Thus, the PCIe lanes connect the I/O slots, and I/O modules inserted therein, to the SPs (e.g., the main CPU in each of the SPs).

One of the challenges is that there are a limited number of PCIe lanes or connections to/from each main CPU of an SP. A decision is made regarding how to allocate or partition the number of PCIe lanes among the different I/O slots of each SP. The number of PCIe lanes allocated to each I/O slot limits the maximum bandwidth the I/O modules inserted or installed in the I/O slot can support. For example, in at least one data storage system, for each SP, there are 16 PCIe lanes allocated to two 8 PCIe lane I/O slots. The 8 PCIe lanes configured for each of the two I/O slots can provide sufficient PCIe bandwidth to not limit or restrict the bandwidth capabilities of, for example, 4 port 16 Gb/s Fibre Channel (FC) I/O cards or modules. However, as newer I/O modules have more performance and are capable of higher bandwidths, the 8 PCIe lanes may unduly limit and not support the available performance or higher bandwidth capabilities of some such new I/O modules (e.g., more bandwidth may be coming into the single I/O module than can be handled or supported by the allocated and configured 8 PCIe lanes for the single I/O module). For example, the 8 PCIe lanes allocated to a single I/O slot would unduly limit the bandwidth of a 4 port 32 Gb/second FC I/O module or a 2 port 50 Gb/second Ethernet I/O module. Some I/O modules may require all 16 PCIe lanes to support the performance capabilities of a single I/O module.

Described herein are embodiments of techniques that may be used to provide flexible I/O slot connections so that available PCIe lanes, such as the 16 PCIe lanes noted above, may be configured, such as under software control, to support any one of multiple configurations. Additionally, an existing configuration or allocation of the 16 PCIe lanes may be further reallocated or reconfigured at various points in time responsive to the particular I/O module, if any, inserted into each of the I/O slots in the system at such various points in time. For example, in at least one embodiment, the 16 PCIe lanes may be configured under software control to support either a first configuration with two 8 lane PCIe I/O slots or a second configuration with a single 16 lane PCIe I/O slot (whereby no lanes are configured for the second I/O slot). Assume, for example, at a first point in time that the first configuration is selected and configured whereby a 4 port 16 Gb/second FC I/O module is inserted in each of the 2 I/O slots. At a second later point in time, a user may replace the foregoing 4 port 16 Gb/second FC I/O module currently in the first I/O slot with a 2 port 50 Gb/second I/O module and leave the second I/O slot empty. At this second point in time, techniques herein may provide for reallocating or reconfiguration the 16 PCIe lanes to the second configuration with the 16 lanes allocated solely to the first I/O slot and no lanes allocated to the empty second I/O slot. In at least one embodiment, a multiplexer (MUX) may be used to provide the desired flexible I/O slot configuration. Such an embodiment using a MUX generally provides advantages, such as low dollar cost, small amount of on-board component space, over other components. Additionally, at least one embodiment may use policies specified by a manufacturer or vendor, as well as end-user specified policies, which may define how the system will respond, and how PCIe lanes will be configured, when I/O modules are inserted or removed from I/O slots. For example, an end user may set a policy that once an I/O slot is configured as a 16 PCIe lane slot, it will not revert to (be reconfigured as) an 8 PCIe lane I/O slot until a user approves or confirms the configuration change. The foregoing and other aspects of techniques herein as may be included in an embodiment are described in more detail in following paragraphs.

Figure 2:
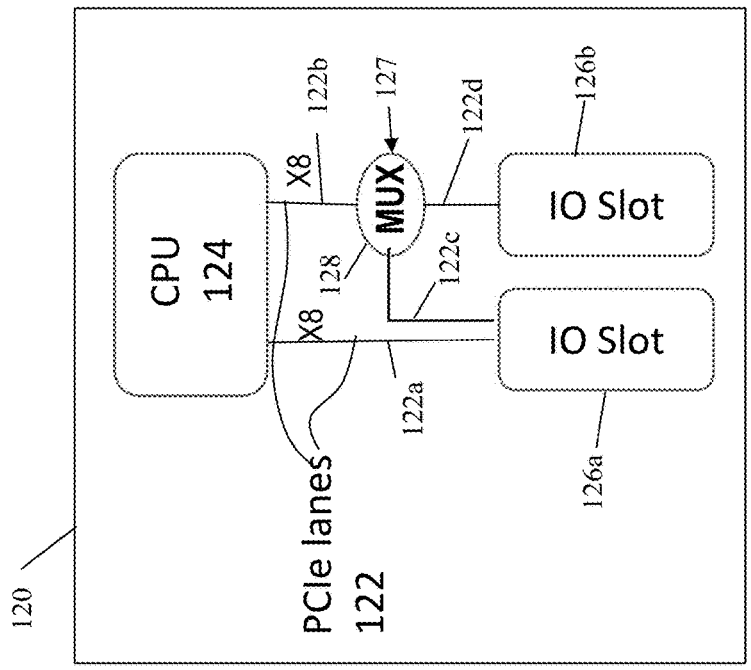
FIG. 2 is an example illustrating components configured in a system not in accordance with techniques herein and also components configured in a system in accordance with techniques herein.
Figure 2:
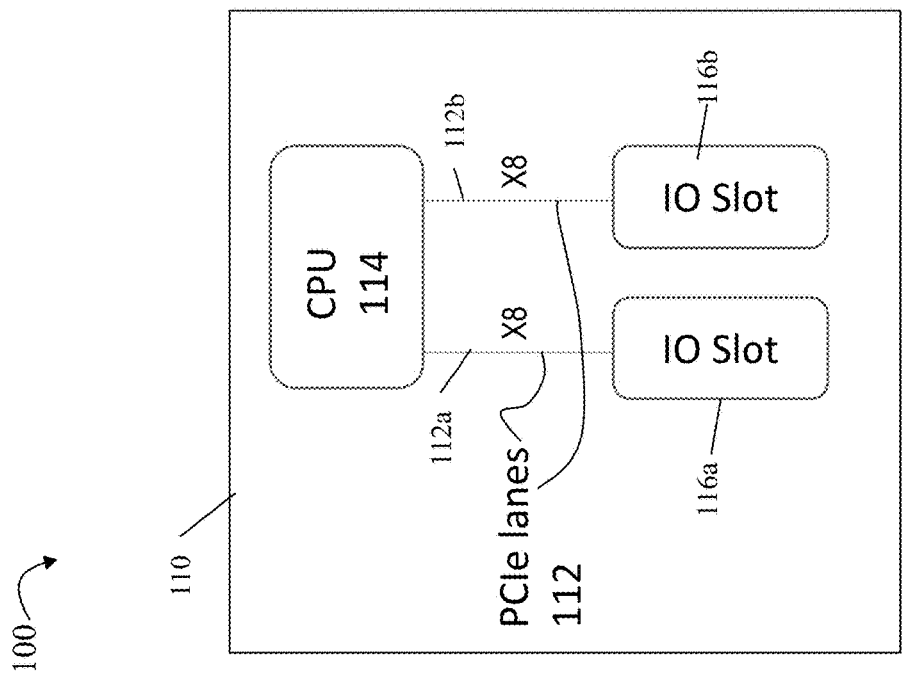

Referring to FIG. 2, shown is an example illustrating an existing configuration 110 not in accordance with techniques herein and also an example of a configuration 120 that is in accordance with techniques herein. The element 110 illustrates components that may be included (along with others not illustrated for simplicity) in a single SP of a data storage system. In at least one existing system not in accordance with techniques herein, the SP 110 may include a main CPU 114, I/O slots 116a-b, and PCIe lanes 112. The PCIe lanes 112 may be configured into two sets or groups each including 8 PCIe lanes (e.g., denoted 2×8 lanes) 112a-b. In the system configuration 110 not in accordance with techniques herein, each of the I/O slots 116a-b may be allocated 8 lanes (e.g., 8 PCIe lanes 112a configured for I/O slot 116a and 8 PCIe lanes 112b configured for I/O slot 112b). As described above, such a configuration may be suitable for use with two I/O modules, such as when both slots 112a-b each include a 4 port 16 Gb/second FC I/O module. However, such a configuration would not provide sufficient PCIe bandwidth, for example, for a 4 port 32 GB/second FC I/O module alternatively inserted into I/O slot 116a. In this latter case where a 4 port 32 GB/second FC I/O module is inserted into I/O slot 116a, it may be that the second I/O slot 116b has no I/O module inserted therein. In such a case, the 8 lanes allocated to I/O slot 116b are unused and it would be beneficial to performance of the 4 port 32 GB/second FC I/O module inserted into I/O slot 116a to reallocate all 16 lanes 112a-b to IO slot 116a. However, with the system of 110 not in accordance with techniques herein, such reallocation and reconfiguration of the 16 PCIe lanes is not possible.

In contrast to element 110 just described, element 120 is an example of an SP and its components operating in accordance with techniques herein. Element 120 includes CPU 124, PCIe lanes 122a-b, and I/O slots 126a-b which are respectively similar to CPU 114, PCIe lanes 112a-b and I/O slots 116a-b as described in connection with element 110. Additionally, element 120 includes MUX 128 having selection bit or signal 127 which provides for selectively configuring the 8 lanes 122b to either I/O slot 126a (by selecting connection or output 122c) or I/O slot 122d (by selecting connection or output 122d). A MUX is device or component known in the art that selects one of N input signals and forwards the selected input along to a single output, or similarly connect a single input signal to a selected one of N outputs. In connection with 120, the MUX 128 is provided selection signal 127 to configure or allocate the 8 lanes 122b for the data transmissions of either 122c and thus I/O slot 126a, or 122d and thus I/O slot 126b. For example, a selection signal 127 having a value of 0 may be provided to select 122c thereby connecting the 8 lanes 122b to I/O slot 126a whereby all 16 lanes 122a-b are configured for use with I/O slot 126a and no lanes are configured for use with I/O slot 126b. Alternatively, a selection signal 127 having a value of 1 may be provided to select 122d thereby connecting the 8 lanes 122b to I/O slot 126b whereby 8 lanes 122a are configured for use with I/O slot 126a and 8 lanes 122b are configured for use with I/O slot 126b. In this manner, by varying the selection signal 127 to 0 or 1, the MUX 128 in an embodiment in accordance with techniques herein may provide for reconfiguration and reallocation of the 8 lanes 122b to either of the I/O slots 126a or 126b as may be desired for use in the system depending on the particular I/O modules inserted into 126a-b and whether a particular one of the I/O slots 126a-b may be empty (e.g., no inserted I/O module). In at least one embodiment in accordance with techniques herein, when the MUX 127 selects I/O slot 126a, the 16 lanes combined may be combined into a single connection, as opposed to two 8 lanes connections going to I/O slot 126a. As a variation, in an embodiment in accordance with techniques herein, when the MUX 127 selects I/O slot 126a, the 16 lanes combined may be connected to I/O slot 126a as two 8 lane (2×8) connections going to I/O slot 126a. Generally, one or both of the foregoing variations may be implemented in an embodiment in accordance with techniques herein. Thus, generally, in connection with all examples herein, the resulting combined lanes configured to go to a single I/O slot may be configured into a single connection, two connections, or possibly another suitable number of connections as may be desirable and also allowable in accordance with any restrictions of a particular embodiment.

The MUX and use of techniques as described in connection with 120 is not limited to use with only 16 lanes and only 2 possible I/O slots and connections thereto from which to select. More generally, the MUX and techniques described in connection with 120 may be used with other configurations having a different number of lanes and/or a different number of inputs, or more generally, for selecting from among any suitable number of possible I/O slots and connections thereto. In such cases, the number of bits, N, used for the selection signal 127 is determined in accordance with $2^N$, the number of possible I/O slots or connections possible for selection (to be routed or connected to the allocated or configured lanes, such as the 8 lanes 122b).

In at least one embodiment, the components of 120 may include additional components as will now be described in connection with FIG. 3.

Figure 3:
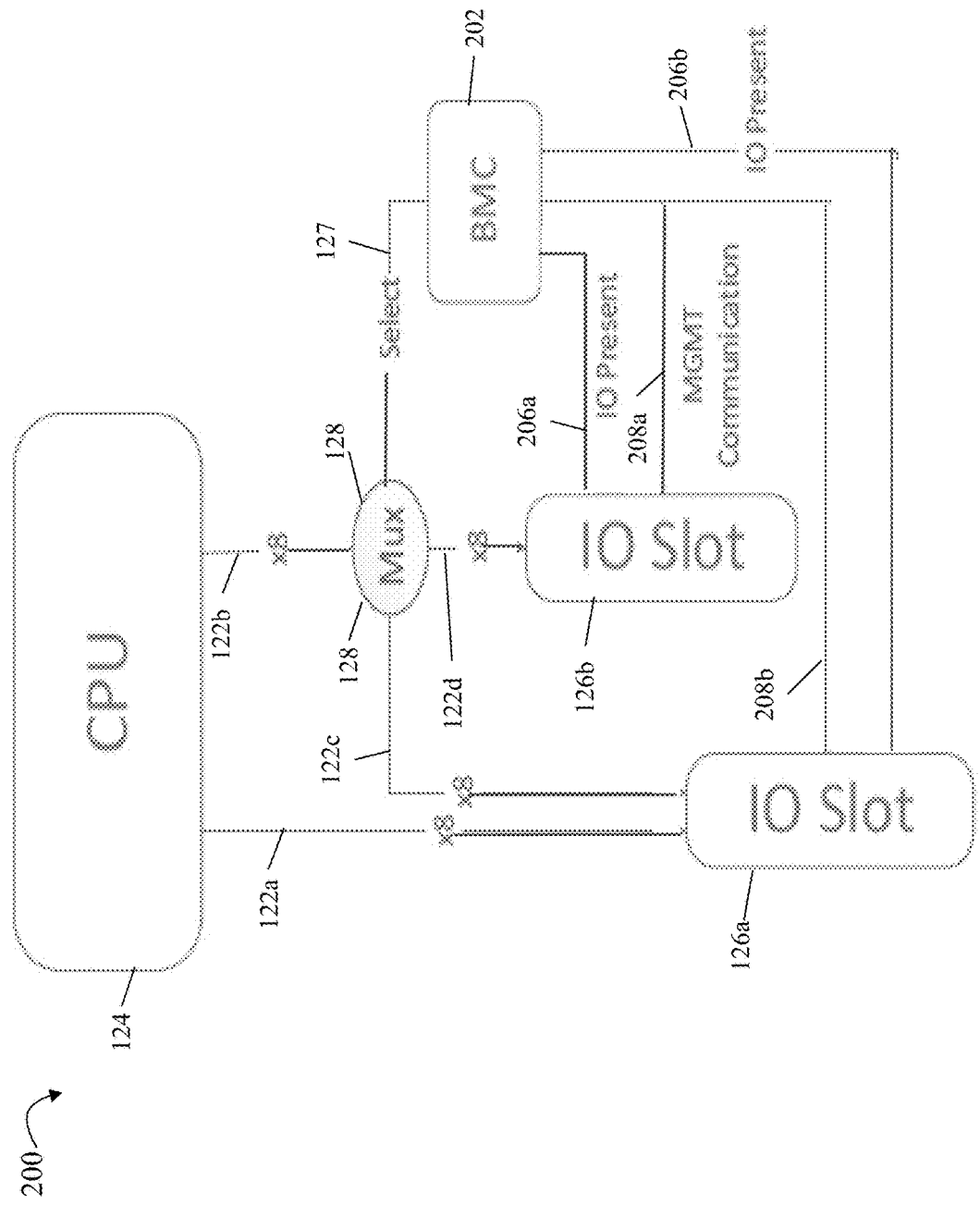

Referring to FIG. 3, shown is an example 200 illustrating components that may be used and included in the SP 120 in at least one embodiment in accordance with techniques herein. The example 200 includes components numbered similarly to those illustrated and described in connection with element 120 of FIG. 2. Additionally, the example 200 includes baseboard management controller (BMC) 202, I/O present signal lines 206a-b, and management (MGMT) communication or interface connections 208a-b. The BMC 202 is a component that includes its own processor (and possibly processor local memory, FPGAs, and other components that may vary with embodiment). In at least one embodiment, the connections 208a-b may be I2C connections providing communication between components, such as I/O slots 126a-b and BMC 202, in accordance with the I2C protocol known in the art.

In at least one embodiment in accordance with techniques herein, the BMC 202 performs processing regarding control and management such as related to the configuration of the available 16 PCIe lanes 122a-122b. The BMC 202 may execute code to enforce one or more defined policies that describe actions to take responsive to detection of change in conditions, status, and the like, regarding I/O modules inserted into I/O slots 126a-b. The BMC 202 may receive an I/O present signal or indicator 206a from I/O slot 126b indicating whether an I/O module is currently inserted, or not, in I/O slot 126b. Similarly, the BMC 202 may receive an I/O present signal or indicator 206b from I/O slot 126a indicating whether an I/O module is currently inserted, or not, in I/O slot 126a. For example, indicator or signal 206a may be 0 (zero) when I/O slot 126b is empty, and may otherwise be 1 (one) when an I/O module is inserted into I/O slot 126b. Similarly, indicator or signal 206b may be 0 (zero) when I/O slot 126a is empty and may otherwise be 1 (one) when an I/O module is inserted into I/O slot 126a. In this manner, the value of signals or indicators 206a and 206b may continually reflect the current and possibly dynamically changing status of whether, respectively, I/O slots 126b and 126a have I/O modules inserted therein. In at least one embodiment, indicators or signals 206a-b may be one-way signals provided, respectively, from the I/O slots 126b-a to the BMC 202 indicating the current status of whether an I/O module is inserted in each of the I/O slots 126b-a. The BMC 202 may communicate with the I/O slots 126a and 126b, and I/O modules inserted therein, using, respectively, MGMT communication connections 208b and 208a. In at least one embodiment in accordance with techniques herein, connections 208a-b may be two-way communication connections. The BMC 202 may communicate with or query I/O slot 126a over MGMT connection 208b to obtain information regarding the current type of I/O module inserted into 126a. Similarly, the BMC 202 may communicate with or query I/O slot 126b over MGMT connection 208a to obtain information regarding the current type of I/O module inserted into 126b.

In at least one embodiment, at a first point in time at system startup (e.g., such as when the data storage system is powered up, rebooted, restarted and the like), the BMC 202 may receive I/O present indicators or signals 206a, 206b indicating whether I/O modules are currently inserted in 126b, 126a. Responsive to I/O present indicator 206a indicating that I/O slot 126b has an I/O module inserted therein, the BMC 202 may then query I/O slot 126b over MGMT communication connection 208a to obtain information regarding the type of I/O module currently inserted in 126b. Responsive to I/O present indicator 206b indicating that I/O slot 126a has an I/O module inserted therein, the BMC 202 may then query I/O slot 126a over MGMT communication connection 208b to obtain information regarding the type I/O module currently inserted in 126a. Based on the indicators 206a,b and the type of I/O modules information received by the BMC 202 responsive to any of the foregoing queries, the BMC 202 may generate select signal 127 provided as the selection signal to MUX 128. Responsive to receiving the select signal 127, the MUX 128 accordingly either connects 122c (e.g., if select signal=0) or 122d (e.g., if select signal=1) to the 8 PCIe lanes 122b.

At a later point in time subsequent to the above-noted first point in time, there may be a change in one or more of the I/O present indicators 206a-b, such as responsive to a user removing an existing, currently inserted I/O module from an I/O slot, or a user inserting a new I/O module into an empty I/O slot. Responsive to detecting such a change in any one or more of the I/O present indicators 206a-b, the BMC 202 may once again query one or more of the I/O slots 126b, 126a. In at least one embodiment, responsive to any detected change in the status of indicators 206a-b (e.g., any indicator that experiences a change from 0 (no module inserted) to 1 (module inserted), or a change from 1 (module inserted) to 0 (module removed)), the BMC 202 may query one or more of the I/O slots 126b, 126a as described above to obtain information regarding the type I/O module currently inserted in 126b, 126a. Responsive to I/O present indicator 206a indicating that I/O slot 126b has an I/O module inserted therein, the BMC 202 may then query I/O slot 126b over MGMT communication connection 208a to obtain information regarding the type of I/O module currently inserted in 126b. Responsive to I/O present indicator 206b indicating that I/O slot 126a has an I/O module inserted therein, the BMC 202 may then query I/O slot 126a over MGMT communication connection 208b to obtain information regarding the type I/O of module currently inserted in 126a.

In at least one embodiment, the information returned to the BMC 202 responsive to its query regarding the type of I/O module currently inserted in one of the I/O slots 126a,b may identify various parameters or attributes regarding the inserted I/O module relevant to determining its performance capability. For example, such information may identify the bandwidth capability (e.g., 50 Gb/second, 16 Gb/second) of the inserted I/O module where such information may be used by the BMC 202 in determining the value of the select signal 127 and accordingly how to configure or allocate the 8 lanes 122b with respect to the I/O slots 126a, 126b.

As a variation to the foregoing as described above, the BMC 202 may periodically poll or query the I/O slots 126a, 126b using connections 206b, 206a to obtain information regarding the type of I/O modules currently inserted therein, if any. In at least one embodiment, such a variation may be performed without use of the I/O present indicators 206a-b. In such an embodiment, the BMC 202 may query all I/O slots 126a, 126b over connections 206b, 206a at startup at the first point in time and then periodically repeat such querying to determine whether there has been any change with respect to each I/O module's insertion status (e.g., change from EMPTY to INSERTED where the empty slot changed to now have an I/O module inserted, or INSERTED to EMPTY where the I/O slot had an inserted I/O module that is now removed), or a change with respect to the type of I/O module inserted in any of the I/O slots (e.g., whether a user replaced an existing I/O module of a slot with a new different I/O module).

In at least one embodiment, I/O module removal, replacement and/or insertion may require first powering down the system and then performing any desired changes with respect to I/O modules inserted into or removed from I/O slots 126a, 126b. In such an embodiment, the BMC 202 need only perform processing as described above in connection with system startup at the first point in time whereby any reconfiguration or reallocation of the 16 lanes is performed when the system is restarted or rebooted.

As a variation, the data storage system may support hot plugging removal and insertion of I/O modules into the I/O slots 126a, 126b. In such an embodiment, the BMC 202 may perform processing as described above in connection with the first point in time as well as at the second point in time when the user performs the I/O module insertion, removal or swap while the system is running. In connection with hot plugging support, inserting, removing or swapping an I/O module in any of the I/O slots does not require a reboot (e.g., does not require power down, perform any of insert, remove or swap of I/O module, and then restart or reboot) of the system and may be performed while the system remains running (e.g., without stopping or shutting down the system).

The BMC may perform processing, such as by executing code on its processor, that determines the value of the select signal 127 in accordance with one or more defined policies. The policies may be stored in any suitable location, such as a memory accessible to the BMC 202. In at least one embodiment, a default policy may be included in a system. An embodiment may also provide for one or more user-configurable policies which may override a default policy or may operate simultaneously with the default policy (e.g., the user policy and the default policy may each specify different detected conditions and associated actions to take responsive to such conditions). Following are examples of some policies that may be included in a system in accordance with techniques herein and may be specified as a default policy and/or a user-configurable policy. Such policies described below are made with reference to an embodiment such as in FIGS. 2 and 3 with 2 I/O slots and 16 lanes where the 2 possible allocations or configurations of the 16 lanes are: all 16 lanes to a single I/O slot or allocating 8 lanes to each of the 2 I/O slots.

An example of a policy is described relevant to a state of the SP of FIG. 3 where there are 2 I/O modules inserted into I/O slots 126a, 126b. Each of the 2 I/O modules is a 4 port 16 Gb/second FC I/O module inserted into the I/O slots 126a-b. The policy indicates partition the 16 lanes equally between the 2 I/O slots 126a-b since 8 lanes can handle the bandwidth capability of the 4 port 16 Gb/second FC I/O module inserted in each of the 2 I/O slots 126a-b. The policy also indicates to partition the 16 lanes equally between the 2 I/O slots since both I/O slots 126a-b includes I/O modules of equal or the same bandwidth capability. At a first point in time, the I/O modules are both removed from I/O slots 126a-b and a new I/O modules, a 2 port 50 Gb/second Ethernet I/O module, is inserted into I/O slot 126a with I/O slot 126b remaining empty/no I/O module inserted. In response to detecting the conditions of the state at this first point in time, the policy may indicate to reallocate or reconfigure all 16 lanes to the I/O slot 126a. Thus, the BMC 202 may execute code of the policy and appropriately set the select indicator signal 127 to select 122c thereby configuring the 8 lanes 122b for use by I/O slot 126a rather than I/O slot 126b. In this case, no lanes are allocated to the empty I/O slot 126b and all 16 lanes 122a-b are allocated to I/O slot 126a.

The policy may also indicate whether to perform any reconfiguration or reallocation of the 16 lanes as noted above automatically (e.g., without user confirmation) or whether to require user confirmation (e.g., from user interface of management system) before proceeding the reconfiguration. The policy may also indicate to wait a specified amount of time (e.g., may be a default time value or a user configurable time value) for I/O slot 126b to remain empty before determining that the user is not going to insert another I/O module into slot 126b. The policy may indicate which reconfigurations (e.g., all, or particular ones) require confirmation, or may be performed automatically. For example, the policy may specify that, once the 16 lanes are allocated to a single I/O slot as noted above, user confirmation is required prior to reverting back to a configuration where 8 lanes are allocated to each of the I/O slots 126a-b. However, the policy may indicate to automatically perform without user confirmation the initial reconfiguration of allocating all 16 lanes to a single I/O slot.

In a system that supports hot plugging, the policy may also specify when (e.g., dynamically while system is running/without requiring reboot/restart, or only on reboot/restart) to perform any/all lane reconfigurations or when to perform one or more particular lane reconfigurations. For example, in a system that supports hot plug I/O slots, the policy may indicate to perform any/all lane reconfigurations only on system reboot. As a variation, the policy may indicate to allow reconfigurations to be performed on reboot as well as dynamically while the system is running (e.g., if the user inserts, removes or replaces an I/O module in an I/O slot while the system is running where the reconfiguration of the 16 lanes may be performed while the system is also running). The policy may also indicate that particular reconfigurations are allowed only on reboot, and all others may be performed either dynamically or at reboot.

The policy may specify to partition the 16 lanes to a single one of the I/O slots only if the single I/O slot has an I/O module inserted and while the other remaining I/O slot is also empty. The policy may indicate to partition the 16 lanes equally between the two I/O slots 126a-b if both slots 126a-b have I/O modules inserted therein. Such equal partitioning of 8 lanes per I/O slot 126a-b may be performed independent of (e.g., regardless of) the relevant performance of the I/O modules inserted. For example, the 16 lanes are configured with 8 lanes to each of the I/O slots 126a-b in each of the following detected instances: where both I/O slots 126a-b each have a 4 port 16 Gb/second FC I/O module inserted, where both I/O slots 126a-b each have a 4 port 32 Gb/second FC I/O module inserted, where both I/O slots 126a-b each have a 2 port 50 Gb/second Ethernet I/O module inserted, and where I/O slot 126a has a 2 port 50 Gb/second Ethernet I/O module inserted and I/O slot 126b has a 4 port 16 Gb/second FC I/O module inserted.

As noted above, techniques herein may be used with any number of I/O slots, any number of MUXs, and any size lane grouping.

Figure 4:
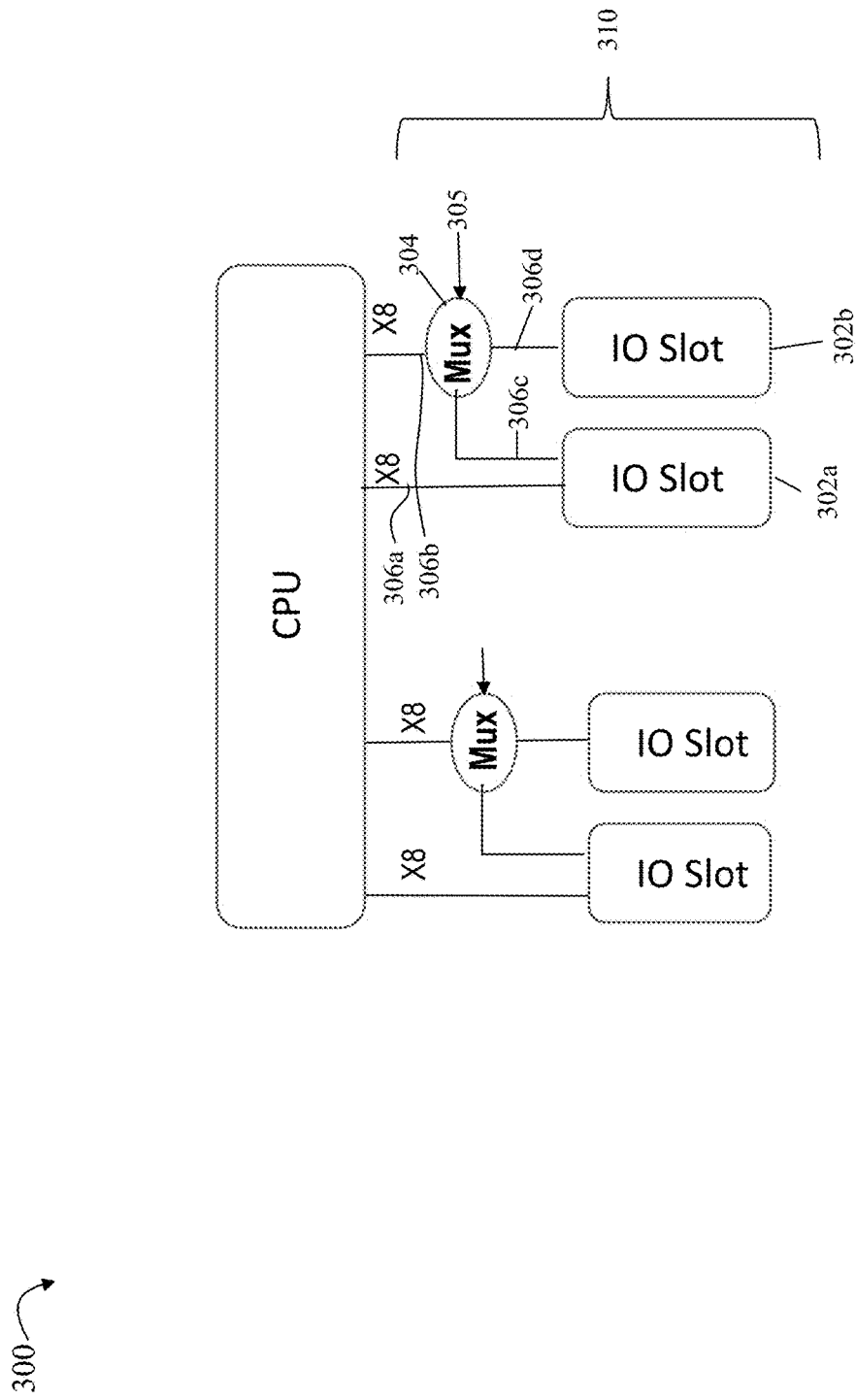

Referring to FIG. 4, shown is an example of another embodiment in accordance with techniques herein. The example 300 includes the same components as illustrated in element 120 of FIG. 2 with the addition of the additional components 310. Element 310 indicates this embodiment includes additional I/O slots 302a-b, MUX 304, and an additional 16 lanes. Additionally, FIG. 4 presents a simplified view of components in a manner as described in connection with element 120 of FIG. 2. Consistent with discussion above such as in connection with FIG. 3, the embodiment of FIG. 4 may also include a BMC 202 with suitable management interface connections and I/O present indicators or signals as described in connection with FIG. 3. For simplicity of illustration, the example 300 omits such additional components. The components of 310 may operate as described elsewhere herein (e.g., FIGS. 2 and 3) to determine a value of the select signal 305 to MUX 304 and configure the 8 lanes 306b either for use with the I/O slot 302a (e.g., select 306c) or with slot 302b (e.g., select 306d). In at least one embodiment, the select signal 305=0 may result in the 8 lanes 306b connected to 306c for use with I/O slot 302a; and the select signal 305=1 may result in the 8 lanes 306b connected to 306d for user with I/O slot 302b. Thus, the example 300 illustrates an embodiment with multiple MUXs as well as additional I/O slots in comparison, for example, to the embodiment of FIGS. 2 and 3.

Figure 5:
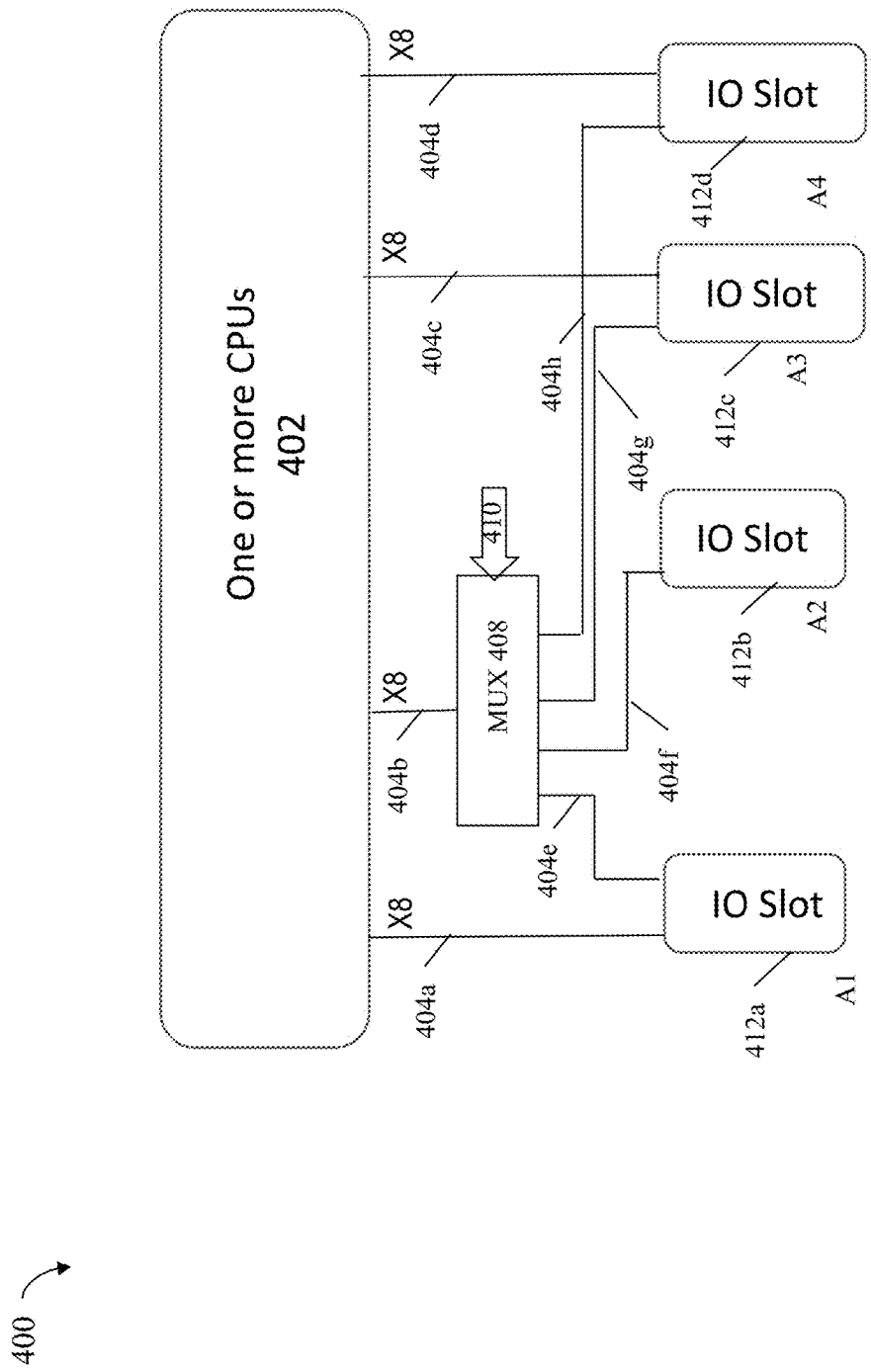

Referring to FIG. 5, shown is an example of another embodiment in accordance with techniques herein. The example 400 illustrates an embodiment with a single MUX 408 and 4 I/O slots. The example 400 includes one or more CPUs 402 (e.g., where one or more CPUs may be configured in a single SP such as in a dual socket arrangement), I/O slots 412a-d, select signal 410. In a manner similar to that as noted above regarding FIG. 4, the example 400 presents a simplified view of components in a manner as described in connection with element 120 of FIG. 2. Consistent with discussion above such as in connection with FIG. 3, the embodiment of FIG. 5 may also include a BMC 202 with suitable management interface connections and I/O present indicators or signals as described in connection with FIG. 3 (although the BMC 202 and management interface connection are omitted from FIG. 5 for simplicity of illustration). In this embodiment, there are 32 lanes in total with 8 lanes allocated to each of the I/O slots 412a, c and d. The remaining 8 lanes 404*b* may be configured for use by any one of the I/O slots 412*a-d* depending on the select signal 410. In this example, the select signal 410 may be any one of 4 values where: 0 connects the 8 lanes 404*b* to 404*e* for use by I/O slot 412*a;* 1 connects the 8 lanes 404*b* to 404*f* for use by I/O slot 412*b;* 2 connects the 8 lanes 404*b* to 404*g* for use by I/O slot 412*c;* and 4 connects the 8 lanes 404*b* to 404*h* for use by I/O slot 412*d.* In such an embodiment as in FIG. 5, a policy may be defined as described above as the default policy. Additionally, another policy may be configured, such as a user-configured policy, which may override the default policy. In other words, processing by the BMC may first try to apply actions and conditions of the user-configured policy. If no relevant condition or state is described by the user-configured policy, then the default policy may be applied. The user-configured policy may determine whether I/O slot 412*b* is empty and, if so, may perform processing to reallocate or reconfigure the 8 lanes 404*b* to another I/O slot. The user-configured policy may provide for automatically selecting a predetermined or default one of the remaining I/O slots 412*a,c* or *d* which is not empty (e.g., such as one of the remaining I/O slots 412*a, c* or *d* which is not empty and which has the highest relative performance I/O module inserted); or having a user select one of the I/O slots 412*a-d.* As described in connection with other policy examples herein, the user-configured policy may specify whether particular reconfigurations occur only on reboot or may occur dynamically while the system is running without requiring reboot. Furthermore the user-configured policy may specify what reconfigurations may be performed automatically or otherwise require user confirmation prior to being performed.

Generally, it should be noted that different implementations of PCI express (PCIe), or other type of connections used, may or may not have certain requirements about which lanes can be combined into a single connection, such as combined into a single 16 lane (×16) connection. Thus, techniques herein may be adapted for use generally in connection with such requirements or restrictions, if any, depending on the embodiment. For example, with reference to FIG. 5, it may be that the particular implementation does not have any restriction on what lanes can be combined into a single 16 lane connection. In such an embodiment with a configuration as illustrated in FIG. 5, techniques herein may be used to possibly configure the 8 lanes 404*b* for use as an additional 8 lanes by slots A1 412, A3 412*c* or A4 412*d.* In such an embodiment not having any restrictions on lane combinations into a single connection, I/O slot A1 412*a*, if selected, may have the combined 16 lanes 404*a* and 404*b* form a single connection to 412*a*; I/O slot A3 412*c*, if selected, may have the combined 16 lanes 404*a* and 404*c* form a single connection to 412*c*; and I/O slot A4 412*d*, if selected, may have the combined 16 lanes 404*a*, 404*d* form a single connection to 412*d.* Alternatively, in another embodiment, one or more of the I/O slots, if selected, may alternatively have the 16 lanes configured for use as multiple lanes, such as two 8 lane (×8) connections. For example, it may be that in such an alternative embodiment, I/O slot A1 412*a*, if selected, may have the 16 lanes combined as a single connection. However, selection of either I/O slots 412*c*, 412*d* may alternatively result in two 8 lane connections to the selected I/O slot. Generally, as noted elsewhere herein, all such variations are possible for use in connection with techniques herein.

Although figures and examples presented illustrate embodiments of techniques herein where the lanes configured for use by I/O modules are from a CPU, more generally, any one or more of the lanes may come from any suitable source. For example, the source lanes configured for use by I/O modules using techniques herein may come from any one or more of the following sources: a CPU, a switch (e.g., PCIe switch), another MUX, and the like.

Additionally, although figures and examples herein illustrate embodiments of techniques herein where the BMC determines the selection for the MUX, more generally, any other suitable component of an embodiment may be used to determine the selection for the MUX. For example, the selection for the MUX may be determined by the CPU and provided as an output signal from a general-purpose input/output (GPIO) pin of the CPU. As known in the art, a GPIO may be characterized as a generic pin on an integrated circuit, computer board or CPU whose behavior is controllable by the user at run time. GPIO pins have no predefined purpose, and go unused by default. In which case, in at least one embodiment, the MUX selection may revert to a manufacturers predefined default state (e.g., denoting a default selection of one of the I/O modules).

What will now be described are flowcharts summarizing processing as described above.

Figure 6:
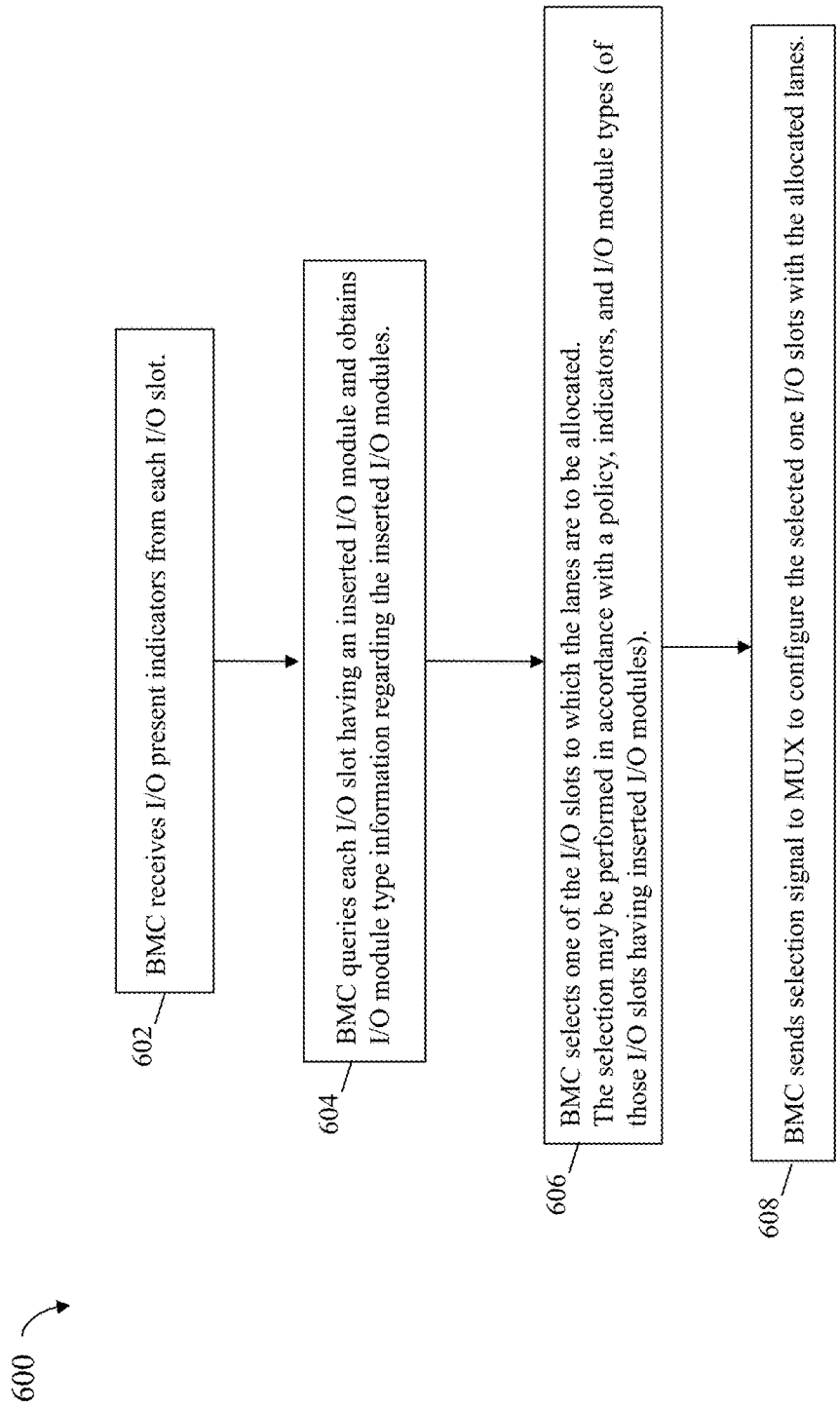
FIGS. 6 and 7 are flowcharts of processing steps that may be performed in an embodiment in accordance with techniques herein.

Referring to FIG. 6, shown is an example of a first flowchart 600 of processing that may be performed in an embodiment in accordance with techniques herein. The flowchart 600 describes processing as may be performed in at least one embodiment which includes I/O present indicators and a BMC as discussed above in connection with an SP in the example 300 of FIG. 3 when selecting one of a number of I/O slots (e.g., such as one of the two I/O slots 126*a,b*) to which to allocate a number of lanes, such as the 8 lanes 122*b*. At step 602, the BMC may receive the I/O present indicator signals for each of the I/O slots. From step 602, control proceeds to step 604. At step 604, the BMC may query each I/O slot having an inserted I/O module and obtains I/O module type information regarding the inserted I/O modules. From step 604, control proceeds to step 606. At step 606, the BMC selects one of the I/O slots, such as from those I/O slots having an inserted I/O module, to which the lanes are to be allocated. The selection of step 606 may be performed by executed code on a processor of the BMC. The selectin of step 606 may be in accordance with one or more policies, indicators, and I/O module types (of those I/O slots having inserted I/O modules).

As noted elsewhere herein, more generally, the selection of the I/O slot in step 606 may be made based solely on presence indicators alone, based solely on information about the IO module types that are inserted, or based on a combination of the foregoing. As such, whether steps 602 and 604, or just one of the steps 602 or 604, are performed may vary with the particular embodiment. Furthermore, as noted elsewhere herein, any such selection of the I/O slot in step 606 may or may not require confirmation/user verification, as may vary with embodiment and policies used.

From step 606, control proceeds to step 608. At step 608, the BMC sends a selection signal to MUX to configure the selected one of the I/O slots with the allocated lanes. In at least one embodiment, the processing of flowchart 600 may be performed at system boot or startup as well as while running, such as in connection with dynamic lane reconfiguration in an embodiment supporting hot plug I/O slots (e.g., hot plugging of I/O modules) without requiring the system be shut down.

Figure 7:
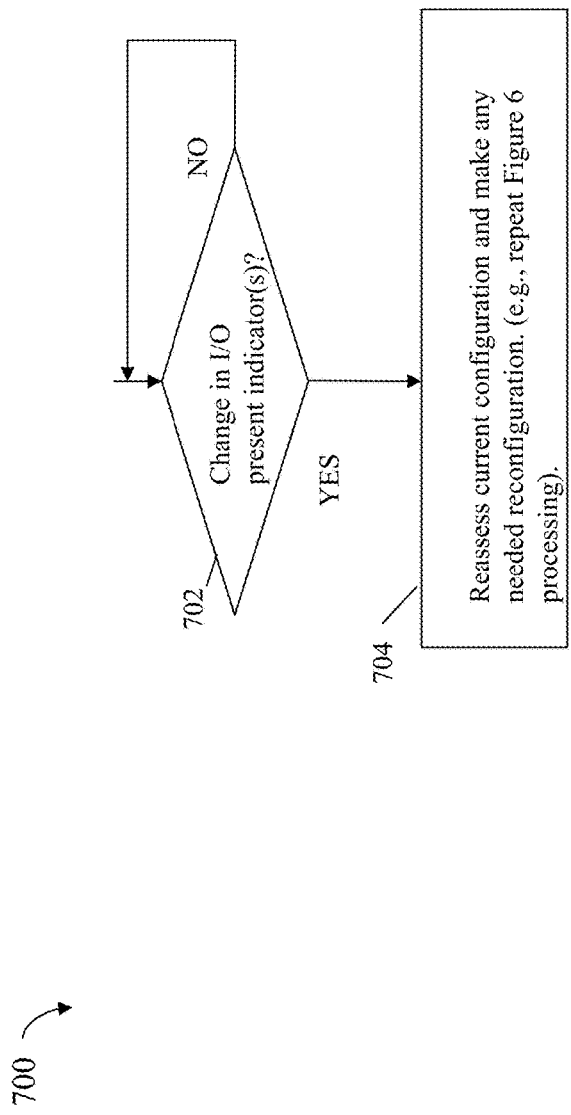

In a system supporting hot plugging of I/O modules, processing may also be performed as illustrated in the flowchart 700 of FIG. 7 to reconfigure or reallocate the 8 lanes 122*b* while the system is running (e.g., without powering down the system). In such an embodiment, the user may insert, remove or swap an I/O module from one or more of the I/O slots while the system is running. At step 702, a determination is made as to whether there is a change in state of any I/O present indicator. Control proceeds at step 702 until step 702 evaluates to yes. As described herein, step 702 evaluates to yes if a user makes a change (e.g., insert, remove, swap) with respect to any I/O module and associated I/O slot insert while the system is running. Upon step 702 evaluating to yes, control proceeds to step 704 to reassess the current configuration and make any needed reconfiguration or reallocation of lanes 122b responsive to the change in state with respect to I/O modules and I/O slots 126a-b. Step 704 may include repeating processing as described in connection with FIG. 6).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. For a data storage system connected to one or more host systems hosting applications executing thereon, the data storage system including at least a first storage processor including one or more CPU cores and a plurality of I/O slots, a method comprising:
   the first storage processor periodically polling the plurality of I/O slots to determine for each I/O slot a type of I/O module, if any, inserted in the I/O slot;
   selecting one of the plurality of I/O slots to be allocated a number of lanes connected to the first storage processor based at least in part on the type of each I/O module determined from the periodical polling; and
   responsive to selecting the one I/O slot, sending a selection signal to a multiplexer that selects the one I/O slot from the plurality of I/O slots and configures the number of lanes for use by the one I/O slot where the number of lanes connect said one I/O slot to the processor.

2. The method of claim 1, wherein, when the number of lanes are configured for use by said one I/O slot, the number of lanes are used for data transmission between the processor and an I/O module inserted in the one I/O slot, whereby no other I/O slot of the plurality of I/O slots is configured to use the number of lanes allocated to said one I/O slot.

3. The method of claim 1, further comprising:
   while said number of lanes are configured for use by said one I/O slot, selecting a second of the plurality of I/O slots to be allocated the number of lanes; and
   responsive to selecting the second I/O slot, sending a second selection signal to the multiplexer that selects the second I/O slot from the plurality of I/O slots and reconfigures the number of lanes for use by the second I/O slot where the number of lanes connect said second I/O slot to the processor.

4. The method of claim 3, wherein said selecting one of a plurality of I/O slots and said selecting a second of the plurality of I/O slots are performed in accordance with a policy.

5. The method of claim 4, wherein the policy indicates to allocate the number of lanes to the one I/O slot rather than the second I/O slot when an I/O module is inserted into the one I/O slot and when no I/O module is inserted in the second I/O slot.

6. The method of claim 4, wherein the policy indicates to allocate the number of lanes to the one I/O slot rather than the second I/O slot when no I/O module is inserted into the second I/O slot and a first I/O module inserted into the one I/O slot has a higher performance bandwidth capability than all I/O modules inserted into any other ones of the plurality of I/O slots.

7. The method of claim 4, wherein the policy indicates to allocate the number of lanes to the second I/O slot rather than the one I/O slot when an I/O module is inserted into the second I/O slot and when no I/O module is inserted in the one I/O slot.

8. The method of claim 4, wherein the policy indicates to allocate the number of lanes to the second I/O slot rather than said one I/O slot when no I/O module is inserted into said one I/O slot and an I/O module inserted into the second I/O slot has a higher performance bandwidth capability than all I/O modules inserted into any other ones of the plurality of I/O slots.

9. The method of claim 4, wherein a current configuration includes the number of lanes allocated for use by a particular one of the plurality of I/O slots, and wherein the policy indicates that user approval is needed prior to modifying the current configuration, wherein said modifying causes reconfiguration of the number of lanes for use by another one of the plurality of I/O slots other than the particular one.

10. The method of claim 9, wherein said modifying includes sending another selection signal to the multiplexer to select the another one of the plurality of I/O slots and causing said reconfiguration of the number of lanes for use by the another one of the plurality of I/O slots.

11. The method of claim 4, wherein each of the plurality of I/O slots is a hot plug I/O slot wherein an I/O module may be inserted into, and removed from, said each I/O slot without restarting the system.

12. The method of claim 4, further comprising:
   determining, by the management controller, the type of I/O module, if any, that is inserted into each of the plurality of I/O slots.

13. The method of claim 12, wherein the management controller selects the one I/O slot from the plurality of I/O slots in accordance with the policy and wherein the management controller sends the selection signal to the multiplexer that selects the one I/O slot from the plurality of I/O slots and configures the number of lanes for use by the one I/O slot.

14. The method of claim 12, wherein the management controller performs said determining using management interface connections to said plurality of I/O slots.

15. The method of claim 14, wherein each of the plurality of I/O slots provides an indication signal to said management controller as to whether an I/O module is inserted in said each I/O slot.

16. The method of claim 15, wherein said management controller performs said selecting a second of the plurality of I/O slots to be allocated the number of lanes responsive to a change in the indication signal sent from a sending one of the plurality of I/O slots.

17. The method of claim 16, wherein the change in the indication signal from the sending one I/O slot indicates whether an I/O module has been removed from the sending one I/O slot or whether an I/O module has been inserted into the sending one I/O slot.

18. The method of claim 17, further comprising:
receiving, by the management controller, the change in the indication signal sent from the sending I/O slot; and
responsive to the change in the indication signal from the sending one I/O slot indicating that an I/O module has been inserted into the sending one I/O slot, querying the sending one I/O slot, using a management interface connection, regarding a type of I/O module inserted in the sending one I/O slot.

19. For a data storage system connected to one or more host systems hosting applications executing thereon, the data storage system including at least a first storage processor including one or more CPU cores and a plurality of I/O slots, a computer readable medium comprising code thereon that, when executed, performs a method comprising:
the first storage processor periodically polling the plurality of I/O slots to determine for each I/O slot a type of I/O module, if any, inserted in the I/O slot;
selecting one of the plurality of I/O slots to be allocated a number of lanes connected to the first storage processor based at least in part on the type of each I/O module determined from the periodical polling; and
responsive to selecting the one I/O slot, sending a selection signal to a multiplexer that selects the one I/O slot from the plurality of I/O slots and configures the number of lanes for use by the one I/O slot where the number of lanes connect said one I/O slot to the processor.

20. A data storage system connected to one or more host systems hosting applications executing thereon, the data storage system comprising:
at least a first storage processor including one or more CPU cores and a plurality of I/O slots; and
a memory comprising code stored therein, that, when executed, performs a method comprising:
the first storage processor periodically polling the plurality of I/O slots to determine for each I/O slot a type of I/O module, if any, inserted in the I/O slot;
selecting one of the plurality of I/O slots to be allocated a number of lanes connected to the first storage processor based at least in part on the type of each I/O module determined from the periodical polling; and
responsive to selecting the one I/O slot, sending a selection signal to a multiplexer that selects the one I/O slot from the plurality of I/O slots and configures the number of lanes for use by the one I/O slot where the number of lanes connect said one I/O slot to the first processor.

* * * * *